United States Patent Office 3,226,403
Patented Dec. 28, 1965

3,226,403
DIESTERAMIDE PLASTICIZERS
Frank C. Magne, Robert R. Mod, and Evald L. Skau, New Orleans, La., assignors to the United States of America as represented by the Secretary of Agriculture
No Drawing. Original application Oct. 24, 1961, Ser. No. 147,377, now Patent No. 3,179,615, dated Apr. 20, 1965. Divided and this application Jan. 22, 1963, Ser. No. 263,367
5 Claims. (Cl. 260—348)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a division of Serial No. 147,377, filed October 24, 1961, now Patent No. 3,179,615.

This invention relates to a plastic composition, the plasticizer component of which is a novel class of amides. The amides which form the plasticizer component of the resinous composition which is subject of this invention have the ability to plasticize both the hydrophilic and the hydrophobic type of resins and in addition are characterized by their ability to confer softening characteristics on nitrile rubbers.

It is known to prepare amides of the type represented by the formula

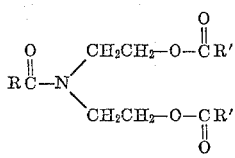

where R and R' are the same substituent alkyl group (particularly a saturated alkyl group with chain length of from 2 to 9 carbon atoms). These amides have recognized utility as plasticizers for vinyl-chloride-type resins, but it is well known that whenever the length of the carbon chain in the substituent alkyl groups exceeds 8 or 9 carbon atoms, i.e., when $R=R'=C_nH_{2n+1}$ and $n$ exceeds 9, compatibility with the vinyl-chloride-type resins is lost. It is known that compounds of the formula

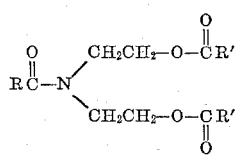

are incompatible if $R=R'=CH_3$; or if $R=R'=$ a long chain monounsaturated alkenyl group such as $C_{17}H_{33}$. We have found that compounds of this formula are also incompatible if $R'=CH_3$ and R is a long chain saturated alkyl such as $C_{15}H_{31}$; or if $R'=CH_3$ and R is a long chain polyunsaturated alkenyl such as $C_{17}H_{31}$. We have made the surprising discovery, however, that compounds of this formula are compatible if $R'=CH_3$ and R is either a long chain monounsaturated alkenyl group such as $C_{17}H_{33}$ or a long chain saturated or monounsaturated group containing at least one epoxy group such as $C_{17}H_{33}O$ or $C_{17}H_{31}O$.

It is the object of this invention to supply amides of the type represented by the formula

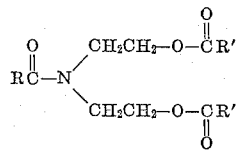

wherein R is an alkenyl group of chain length $C_{11}$ to $C_{21}$, the group being monounsaturated and/or epoxidized, i.e., containing only one olefinic group and/or at least one epoxy group. R' may also be phenyl, cyclohexyl, a substituted phenyl such as $—C_6H_4COOR''$, where R'' represents a saturated alkyl group of less than about 9 carbon atoms.

It is also the object of this invention to supply mixtures of amides represented by this formula consisting predominantly of diesteramides in which R represents an alkenyl group (or groups) of chain length $C_{11}$ to $C_{21}$, these groups being monounsaturated and/or monounsaturated containing at least one oxirane ring and/or saturated containing at least one oxirane ring, and R' is a saturated alkyl group containing 3 or less carbon atoms.

These diesteramides are efficient primary solvent-type plasticizers exhibiting good compatibility with, and imparting long-term thermal stability, low volatility, and low-brittle point to polymer and copolymer compositions of vinyl chloride. The diesteramides are also, quite unexpectedly, efficient plasticizers for cellulose triacetate and in addition they possess utility as softeners for nitrile rubbers. The term "vinyl chloride resins" is used throughout this specification and the accompanying claims to refer to polymers and copolymers of monomers containing vinyl chloride in a predominant proportion in parts by weight. The term "nitrile rubber" is well known in the synthetic elastomer art as referring to copolymers of acrylonitrile and butadiene in varying proportions. See, for example, Whitby et al., "Synthetic Rubber" (John Wiley and Sons, New York, 1954), page 795. These synthetic rubbers are commercially available from a number of manufacturers under a variety of proprietary names. The terms such as "good compatibility," "compatible," and "compatible plasticizers" in reference to plasticizers for vinyl chloride resins are used throughout the specification to refer to plasticizers which show no signs of exudation or migration to the surface for at least 30 days when the plasticizer is present in the proportion of about 60 parts per 100 parts by weight of vinyl chloride resin.

The term long chain fatty acid is used through this specification and the accompanying claims to refer to monocarboxylic aliphatic acids containing 12 or more carbon atoms.

The compatible diesteramides are primary plasticizers and act as compatibilizers for incompatible diesteramides. For example, the binary compositions where

is composed of 75% oleoyl-25% palmitoyl or 85% epoxyoleoyl-15% palmitoyl and in which R' is $CH_3$ are compatible, as are all proportions of these two binary mixtures. Ternary compositions can tolerate even larger proportions of palmitoyl than would be expected; e.g., the 30% palmitoyl-35% epoxyoleoyl-35% oleoyl mixture is fully compatible. Thus, mixtures of long chain fatty acids or esters can be used to prepare compatible diesteramides providing there is a predominance of monoolefinic, epoxy-saturated, or epoxymonoolefinic long chain fatty acids individually or in combination in the mixture. The fatty acids obtained from cottonseed oil consist roughly of 27% of saturated (mostly palmitic) acid, 27% of monounsaturated (oleic) acid, and 46% of polyunsaturated (linoleic) acid. The diesteramides prepared from cottonseed oil acids are incompatible because of the large proportion of saturated and polyunsaturated acyl groups in the mixture. Compatible diesteramides can, however, be prepared from cottonseed oil acids which have been modified either by converting the polyunsaturated acyls in the mixture to monounsaturated acyls by selective hydrogenation, dimerization, halogenation, and epoxidation, or by converting the polyunsaturated acyls alone or both the polyunsaturated and the monounsaturated acyls to saturated epoxyacyls. Similar adjustments in composition can be made in the fatty acid mixtures obtainable from other natural sources, such as vegetable or animal oils and fats, tall oil, and the like, to prepare compatible diesteramides. These adjustments of the degree of unsaturation may be performed on the original oils, on the acids, on the esters, or on the diesteramides prepared from them. In general it is usually preferred to perform the epoxidation at the diesteramide stage.

The amides which are the subject of this invention we shall refer to as diesteramides and they can be prepared as we shall show presently in a variety of ways. These diesteramides, which carry two substituent alkyl groups, e.g., two methyl groups and one substituent alkyl group of chain length exceeding 11 carbon atoms which substituent group may be monounsaturated and/or epoxidized are, as noted above, unexpectedly compatible with vinylchloride type resins. When the long-chain substituent group is monounsaturated, complete compatibility with vinyl type resins exists up through chain lengths of $C_{17}$. Additionally, if the long chain substituent group is an epoxy-containing saturated or monounsaturated group, compatibility with vinyl chloride type resins extends through $C_{21}$ chain lengths.

The diesteramides which are the subject of this invention can be prepared by the following sequential reactions. First, an alkanolamine such as diethanolamine is reacted with the alkyl ester, e.g., the methyl ester, of a long-chain fatty acid. This initial reaction is an ester-exchange type of reaction and is carried out in the presence of an alkoxide catalyst; e.g., sodium methoxide. If the alkanolamine used is diethanolamine, a N-bis(2-hydroxyethyl) amide of a fatty acid is formed. The product of this first reaction is subsequently reacted with the acid anhydride or the acid chloride of an acid such as acetic, propionic, benzoic, hexahydrobenzoic acid, or of the monoester of dibasic acids such as phthalic or succinic acids or of the diesters of tribasic acids such as phosphoric acid. Acetic or benzoic acid is the preferred acid to esterify the two hydroxyl groups present. The diesteramides prepared by the aforementioned sequence of reactions, we shall refer to as "symmetrical" diesteramides prepared by the "directed" method.

Other alkanolamines which may be used instead of diethanolamine are dialkanolamines such as di-isopropanolamine (1,1'-imino-di-2-propanol), 3,3'-iminodipropanol, and the like.

It is possible, alternatively, to prepare diesteramides by reacting simultaneously all the components (the dialkanolamine and the two fatty acids of different chain lengths). The result of this alternative process wherein all of the reaction components are present at the same time in the reaction mixture produces what we shall refer to hereinafter as the "mixed" diesteramides produced by the "undirected" method. Since the reaction is a random one, the precise location of the various alkyl substituents is not known and cannot be predicted with certainty as it can with the directed reaction method. Mixed diesteramides could possibly contain all of the following diesteramides:

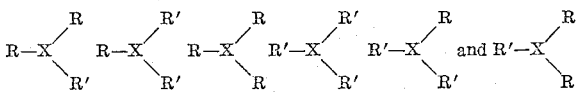

where X represents the moiety

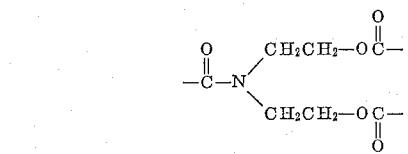

The following examples are set forth by way of illustration only and it will be understood that the invention is not to be construed as limited by the details therein.

*Example 1.—N-bis(2-acetoxyethyl)oleamide*

Two hundred and ninety-six grams (1 mole) of methyl oleate was slowly added to a vigorously stirred mixture of 105 grams (1 mole) of diethanolamine and 3.6 grams (0.15 moles) of metallic sodium dissolved in absolute methanol. The reaction was carried out with continued stirring at 65 to 75° C. and at 60 millimeters' pressure. It is necessary to add the methyl oleate slowly so as to control frothing of the reaction mixture. The reaction was complete after all the methyl oleate had been added and the evolution of methanol had ceased. The product of this reaction was N-bis(2-hydroxyethyl)oleamide. To 124 grams (approximately 0.34 mole) of N-bis(2-hydroxyethyl)oleamide from the above reaction was slowly added with stirring 80 grams (0.78 mole) of acetic anhydride. The reaction temperature was maintained at 70 to 75° C. during and for an additional 30 minutes subsequent to the addition of the acetic anhydride. The reaction product was taken up in commercial hexane, washed free of acetic acid with water, and stripped of hexane. Analysis of the stripped product showed 3.09% nitrogen. The theoretical nitrogen content for N-bis(2-acetoxyethyl) oleamide is 3.09%. This material was tested as a plasticizer for vinyl chloride resin (see Sample No. 1A in Table I).

A separate fraction of the diesteramide prepared as above was distilled in a short-path still at 0.3 millimeter pressure and a small fraction boiling at 188° C. was rejected. The main distillation-cut, boiling at about 219° C., was tested as a plasticizer for vinyl chloride resin (see Sample No. 1B in Table I).

*Example 2.—N-bis(2-benzoyloxyethyl)oleamide*

To 35 grams (0.10 mole) of N-bis(2-hydroxyethyl) oleamide, prepared as shown in Example 1 and isolated from the reaction mixture by the addition of a slight excess of glycolic acid followed by extraction with hexane, washing and stripping, was added 30.8 grams (0.22 mole) of benzoyl chloride. The reaction was carried out in 35 grams of benzene. The temperature was raised slowly and maintained at 80° C. for two hours following which time 17.3 grams (0.22 mole) of pyridine was added. The temperature was then raised to 98° C., held for one hour, and the reaction mixture then allowed to cool. The reaction product was isolated from this mixture by washing with water, and with aqueous sodium carbonate, and finally stripped to remove the benzene. The product, N-bis(2-benzoyloxyethyl)oleamide, had a nitrogen content of 2.40% (theory 2.43). The product was tested as a vinyl chloride resin plasticizer (see Sample No. 2 in Table I).

*Example 3.—N-bis(2-acetoxyethyl)linoleamide*

This material was prepared by the method of Example 1, substituting methyl linoleate for the methyl oleate. The isolated product gave a nitrogen analysis of 2.87% (theory 3.10%). It was tested as a vinyl chloride resin plasticizer (see Sample No. 3 in Table I).

*Example 4.—N-bis(2-acetoxyethyl)amide of cottonseed oil fatty acids*

This material was prepared by the method of Example 1, using the methyl esters of cottonseed oil fatty acids instead of methyl oleate. (The methyl esters were derived from cottonseed oil fatty acids having an iodine value (I.V.) of 113 and a neutralization equivalent of 273.) This product gave a nitrogen analysis of 3.10% (theory 3.15%). It was tested as a plasticizer for vinyl chloride resin (see Sample No. 4 in Table I).

*Example 5.—N-bis(2-acetoxyethyl)amide of selectively hydrogenated cottonseed oil fatty acids*

This material was prepared by the method of Example 1 using the methyl esters of selectively hydrogenated cottonseed oil fatty acids instead of methyl oleate. (The selectively hydrogenated cottonseed oil fatty acids had an I.V. of 73.2, a thiocyanogen value of 68.0, and a neutralization equivalent of 274.) The product had an I.V. of 44.9 and gave a nitrogen analysis of 3.05% (theory 3.14%). It was tested as a vinyl chloride resin plasticizer (see Sample No. 5 in Table I).

The product, N-bis(2-acetoxyethyl)amide of the hydrogenated cottonseed acids, was tested as a plasticizer for cellulose triacetate (41% acetyl). This composition, cast as a film from a mixture of 30 parts of diesteramide and 100 parts of cellulose triacetate in acetone solvent, was flexible, clear, nongreasy, and withstood repeated flexing along a sharp crease without cracking. This is a compatible composition.

*Example 6.—N-bis(2-acetoxyethyl)epoxyoleamide*

0.077 mole of the product from Example 3 was dissolved in 50 grams of chloroform and added slowly to 192 grams of a chloroform solution of perbenzoic acid, containing 11.7 grams (0.085 mole) of perbenzoic acid, while maintaining a temperature of 0 to 5° C. The reaction mixture was allowed to stand at 0° C. for 24 hours. The N-bis(2-acetoxyethyl)epoxyoleamide was extracted with a volume of diethyl ether equal to two times that of the reaction mixture. The extract was washed free of any benzoic acid, and the ether stripped off. The ether product had a nitrogen content of 2.73% (theory 2.99%) and an oxirane-oxygen content of 3.74% (theory 3.42%). It was tested as a plasticizer for vinyl chloride resin (see Sample No. 6 in Table I).

*Example 7.—N-bis(2-acetoxyethyl)amide of partially epoxidized cottonseed oil fatty acids*

The product of Example 4 was partially epoxidized with perbenzoic acid by the process described in Example 6. In this instance the ratio of perbenzoic acid to amide was 0.056 to 0.077 mole. The oxirane-oxygen content of the product was 2.35%. The product was tested as a plasticizer for vinyl chloride resin (see Sample No. 7 in Table I).

*Example 8.—N-bis(2-acetoxyethyl)amide of completely epoxidized rapeseed fatty acids*

The N-bis(2-acetoxyethyl)amide of rapeseed acids was prepared by the method of Example 1 except that the methyl esters of rapeseed fatty acids were used in place of methyl oleate. This product had an I.V. of 73.8 and a nitrogen content of 2.69% (theory 2.94%). It was evaluated as a vinyl chloride resin plasticizer and found to be incompatible. It was epoxidized by the procedure of Example 7 to an oxirane content of 3.93% using 1.3 moles of perbenzoic acid per mole of amide. The epoxidized product was tested as a vinyl chloride resin plasticizer (see Sample No. 8 in Table I).

*Example 9.—Mixed diesteramides (unidirected process) of selectively hydrogenated cottonseed oil acids and acetic acid*

0.20 mole of diethanolamine, 0.40 mole of glacial acetic acid, 0.205 mole of the selectively hydrogenated cottonseed acids described in Example 5, and 25 ml. of benzene were refluxed in an oil bath at a temperature of 200° C. until there was no further evolution of water. (This was ascertained by observing the water collected in the Dean-Stark trap.) The reaction product was cooled, dissolved in commercial hexane, washed to remove diethanolamine or acetic acid, dried, percolated through a column of activated alumina, and the hexane stripped off. This product gave a nitrogen analysis of 3.09% (theory 3.14%). It was tested as a vinyl chloride resin plasticizer (see Sample No. 9 in Table I).

*Example 10.—Mixed diesteramides of oleic and acetic acids*

The same procedure and the same molar proportions of reactants were used as in Example 9, except that oleic acid was used instead of the hydrogenated cottonseed acids. This product gave a nitrogen analysis of 2.71% (theory 3.09%). It was tested as a vinyl chloride resin plasticizer (see Sample No. 10 in Table I).

*Example 11.—Mixed diesteramides of epoxidized cottonseed oil acids and acetic acid*

The same procedure and the same molar proportions of reactants were used as in Example 9 except that the cottonseed oil fatty acids described in Example 4 were used instead of the hydrogenated cottonseed oil fatty acids. This product gave a nitrogen analysis of 2.73% (theory 3.14%). It was partially epoxidized using the same process and molar proportions of amide and perbenzoic acid as shown in Example 7. The end product had an oxirane-oxygen content of 1.58%. It was tested as a vinyl chloride resin plasticizer (see Sample No. 11 in Table I).

The various diesteramides were tested as plasticizers for vinyl chloride-vinyl acetate (95.5) copolymer resin (Vinylite VYDR) in the following formulation:

| | Percent |
|---|---|
| Vinyl chloride resin | 63.5 |
| Diesteramide | 35.0 |
| Stearic acid | 0.5 |
| Basic lead carbonate | 1.0 |

This formulation for each diesteramide sample was milled, molded, and tested. The results are shown in Table I, Examples 1 through 11. In all examples the sample was rated incompatible if the molded stock showed any evidence of exudation or migration to the surface during a shelf storage of 30 days.

The following formulation was used to test the diesteramides as softeners for a commercially available 33% acrylonitrile nitrile rubber:

| | Parts |
|---|---|
| Nitrile rubber | 100.0 |
| SRF black | 60.0 |
| Zinc oxide | 5.0 |
| Stearic acid | 1.5 |
| Sulfur | 1.5 |
| Benzothiazyldisulfide | 1.5 |
| Softener | 20.0 |

These compositions were cured for 30 minutes at 310° F. The N-bis(2-acetoxyethyl) amides of the hydrogenated and partially epoxidized cottonseed oil acids (prepared in Examples 5 and 7, respectively, were found to be acceptable compatible softeners for nitrile rubber, showing no signs of spewing in 30 days. The test results for these compositions are shown as Samples 5 and 7, respectively, in Table II.

TABLE I

| Sample No. | Tensile strength, p.s.i. | 100% Modulus, p.s.i. | Elongation, percent | Brittle point, °C. | Volatility loss, percent | Compatibility [a] |
|---|---|---|---|---|---|---|
| 1A | 2,810 | 1,620 | 310 | −44 | 0.60 | C |
| 1B | 3,090 | 1,670 | 320 | −43 | | C |
| 2 | 3,700 | 2,500 | 270 | −17 | | C |
| 3 | | | | | | I |
| 4 | | | | | | I |
| 5 | 3,060 | 1,650 | 370 | −36 | 0.82 | C |
| 6 | 3,280 | 1,450 | 370 | −20 | 0.33 | C |
| 7 | 2,910 | 1,620 | 290 | −28 | 0.25 | C |
| 8 | 3,390 | 1,970 | 290 | −25 | | C |
| 9 | 2,510 | 1,810 | 250 | −20 | 0.86 | C |
| 10 | 2,740 | 1,750 | 290 | −50 | 0.37 | C |
| 11 | 3,070 | 1,630 | 390 | −30 | 1.4 | C |

[a] C—compatible. I—incompatible.

TABLE II

| Sample No. | Tensile Strength | | Elongation | | 300% Modulus | | Shore A Hardness, 10 sec. | Weight loss, percent | Brittle point, °C. | Volume change, percent |
|---|---|---|---|---|---|---|---|---|---|---|
| | Unaged, p.s.i. | Aged, p.s.i. | Unaged, percent | Aged, percent | Unaged, p.s.i. | Aged, p.s.i. | | | | |
| 5 | 2,110 | 2,030 | 710 | 440 | 690 | 1,290 | 57 | 1.98 | −44 | 27.5 |
| 7 | 2,140 | 2,200 | 800 | 540 | 550 | 1,220 | 56 | 0.85 | −40 | 30.1 |

We claim:
1. A compound represented by the formula

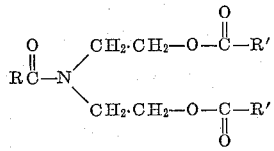

wherein R is a monounsaturated alkenyl group of from 11 to 21 carbon atoms containing at least one epoxy group and R' is methyl.

2. N-bis(2-acetoxyethyl)epoxyoleamide.

3. A compound represented by the formula

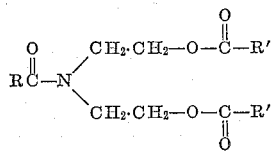

wherein R is a saturated alkyl group of from 11 to 21 carbon atoms containing at least one epoxy group and R' is methyl.

4. A diesteramide composition corresponding to the formula

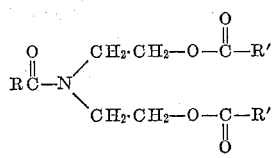

wherein the

moiety represents the composite acyls of the mixed fatty acids of cottonseed oil epoxidized to an oxirane oxygen content of at least 2.0% and R' is methyl.

5. A diesteramide composition corresponding to the formula

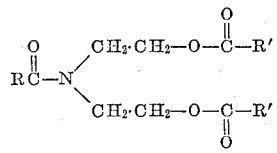

wherein the

moiety represents the composite acyls of the mixed fatty acids of completely epoxidized rapeseed oil and R' is methyl.

References Cited by the Examiner
Ciba, Chem. Abstracts, vol. 43 (1949), p. 4879.

WALTER A. MODANCE, *Primary Examiner.*
NICHOLAS S. RIZZO, *Examiner.*